US012013183B2

(12) United States Patent
Oropeza

(10) Patent No.: US 12,013,183 B2
(45) Date of Patent: Jun. 18, 2024

(54) SPINNING DRYER SYSTEM AND METHODS FOR USE

(71) Applicant: Jesus R. Oropeza, Yuma, AZ (US)

(72) Inventor: Jesus R. Oropeza, Yuma, AZ (US)

( * ) Notice: Subject to any disclaimer, the term of this patent is extended or adjusted under 35 U.S.C. 154(b) by 110 days.

(21) Appl. No.: 17/470,054

(22) Filed: Sep. 9, 2021

(65) Prior Publication Data

US 2021/0404742 A1 Dec. 30, 2021

Related U.S. Application Data

(63) Continuation of application No. 16/566,642, filed on Sep. 10, 2019, now Pat. No. 11,143,455, which is a continuation of application No. 15/433,678, filed on Feb. 15, 2017, now Pat. No. 10,443,936.

(51) Int. Cl.

| | |
|---|---|
| ***F26B 5/08*** | (2006.01) |
| ***F26B 15/04*** | (2006.01) |
| ***F26B 25/00*** | (2006.01) |
| ***F26B 25/12*** | (2006.01) |
| ***F26B 25/18*** | (2006.01) |

(52) U.S. Cl.

CPC ................ *F26B 5/08* (2013.01); *F26B 15/04* (2013.01); *F26B 25/002* (2013.01); *F26B 25/12* (2013.01); *F26B 25/18* (2013.01)

(58) Field of Classification Search

CPC .......... F26B 5/08; F26B 15/04; F26B 25/002; F26B 25/12; F26B 25/18

USPC .......................................................... 34/319

See application file for complete search history.

(56) References Cited

U.S. PATENT DOCUMENTS

| | | | | |
|---|---|---|---|---|
| 4,493,156 | A * | 1/1985 | Siegmann | F26B 5/08 34/322 |
| 4,578,880 | A * | 4/1986 | Motev | B41F 23/005 34/239 |
| 4,628,972 | A * | 12/1986 | LaRochelle | B05B 1/14 141/168 |
| 5,307,567 | A | 5/1994 | Schnake et al. | |
| 5,328,320 | A | 7/1994 | Farrow et al. | |
| 5,715,660 | A | 2/1998 | Balentine | |
| 6,116,849 | A | 9/2000 | Fesmire et al. | |

(Continued)

FOREIGN PATENT DOCUMENTS

| | | |
|---|---|---|
| CN | 202800075 | 3/2013 |
| CN | 202842282 U * | 4/2013 |

(Continued)

OTHER PUBLICATIONS

International Search Report and Written Opinion from corresponding International Patent Application No. PCT/US2018/018353, dated Apr. 30, 2018.

International Preliminary Report on Patentability from corresponding International Patent Application No. PCT/US2018/018353, dated Aug. 29, 2019.

(Continued)

*Primary Examiner* — John P McCormack

(74) *Attorney, Agent, or Firm* — SNELL & WILMER L.L.P.

(57) ABSTRACT

A system for drying wet food articles (such as produce) is disclosed herein. The system can comprise a turntable capable of rotating multiple barrel stations. The system can comprise various loading, drying, dumping, and cleaning positions, and the barrel stations can be rotated to each of these positions. The present disclosure also describes various methods for drying wet food articles utilizing such systems.

18 Claims, 5 Drawing Sheets

(56) References Cited

U.S. PATENT DOCUMENTS

| | | | | |
|---|---|---|---|---|
| 6,260,391 | B1 | 7/2001 | Rippe | |
| 7,347,007 | B2 | 3/2008 | Maguire | |
| 10,443,936 | B2 | 10/2019 | Oropeza | |
| 2004/0211081 | A1 * | 10/2004 | Heinzen | F26B 5/08 34/58 |
| 2009/0307849 | A1 | 12/2009 | Cassisi et al. | |
| 2012/0296147 | A1 | 11/2012 | Swearingen et al. | |
| 2013/0337133 | A1 * | 12/2013 | Meeke | B04B 5/10 99/503 |
| 2015/0176182 | A1 | 6/2015 | Choi | |
| 2017/0205209 | A1 | 7/2017 | Coe et al. | |

FOREIGN PATENT DOCUMENTS

| | | |
|---|---|---|
| CN | 204107407 | 1/2015 |
| WO | WO 2018152314 | 8/2018 |

OTHER PUBLICATIONS

Non-Final Office Action from U.S. Appl. No. 15/433,678, dated Jan. 4, 2019.

Examiner Interview from U.S. Appl. No. 15/433,678, dated Apr. 10, 2019.

Notice of Allowance from U.S. Appl. No. 15/433,678, dated Jun. 3, 2019.

Non-Final Office Action from U.S. Appl. No. 16/566,642, dated Feb. 12, 2021.

Notice of Allowance from U.S. Appl. No. 16/566,642, dated Jun. 16, 2021.

Sormac B.V., Specification Sheet for Centrifuge SC machine (available at https://www.sormac.eu/en/machines/centrifuge-sc/, accessed Jan. 14, 2022).

Turatti Group, Specification Sheet for Vortex/Automatic Electric Spin Dryer machine (available at https://home.turatti.com/en/macchina/vortex/, accessed Jan. 14, 2022).

* cited by examiner

SPINNING DRYER SYSTEM AND METHODS FOR USE

CROSS-REFERENCE TO RELATED APPLICATIONS

This application is a Continuation of, and claims priority to and the benefit of, U.S. Ser. No. 16/566,642, filed Sep. 10, 2019 and entitled "SPINNING DRYER SYSTEM AND METHODS FOR USE," which is a Continuation of, and claims priority to and the benefit of, U.S. Ser. No. 15/433,678, filed Feb. 15, 2017, now U.S. Pat. No. 10,443,936, issued Oct. 15, 2019 and entitled "SPINNING DRYER SYSTEM AND METHODS FOR USE," which are hereby incorporated by reference herein.

FIELD

The present disclosure relates to spinning dryer systems and methods of use of such systems. More particularly, the present disclosure relates to systems having multiple spinning dryers suitable for drying wet food articles, such as produce.

BACKGROUND

Preparation of food articles, such as produce, typically involves rinsing and drying of the food articles prior to packaging for shipment and sale. Spinning dryers are frequently used to dry rinsed food articles. For example, a perforated or mesh barrel can be filled with wet articles and rotated until the articles are sufficiently dry.

Drying wet food articles in this manner can be time and labor intensive. Each barrel must be filled, spun, and emptied. Current systems and processes fill barrels with wet food articles while the barrels are stationary. To ensure consistent drying of the wet food articles, each barrel must be filled, followed by a settling period, to ensure even distribution of the wet food articles within the barrel. The settling period may add a significant amount of time to the overall drying time of the food articles.

In conventional spinning dryer systems, after food articles are sufficiently dry and the barrels have ceased rotating, the barrels are dumped to empty them of the dry food articles. Waiting for the barrels to become stationary before dumping may also add a significant amount of time to the overall drying time of the food articles.

Further, different food articles may require different drying times and drying speeds. Therefore, spinning dryer systems with improved flexibility (including the ability to selectively fill and dump barrels having different food articles), ease of use, and efficiency may be desirable.

SUMMARY

In various embodiments in accordance with the present disclosure, a system for drying wet articles (such as produce) comprises a turntable surrounded by a plurality of outer positions and configured to rotate about a central axis, a first barrel station comprising a first barrel fixedly coupled to the turntable via a first hinge and a first motor coupled to the first barrel, wherein the first hinge pivots the first barrel between an upright position and an inverted position, and wherein the first motor spins the first barrel about a first spin axis, a second barrel station comprising a second barrel fixedly coupled to the turntable via a second hinge and a second motor coupled to the second barrel, wherein the second hinge pivots the second barrel between the upright position and the inverted position independent of the first barrel station, and wherein the second motor spins the second barrel about a second spin axis independent of the first barrel station, wherein the first barrel station and the second barrel station are disposed on a perimeter of the turntable, and the turntable rotates the first barrel station and the second barrel station between the plurality of outer positions.

Spinning dryer systems in accordance with the present disclosure may further comprise a third barrel station comprising a third barrel fixedly coupled to the turntable via a third hinge and a third motor coupled to the third barrel, wherein the third hinge pivots the third barrel between the upright position and the inverted position independent of the first barrel station and the second barrel station, and wherein the third motor spins the third barrel about a third spin axis independent of the first barrel station and the second barrel station, wherein the third barrel station is disposed on the perimeter of the turntable, and the turntable rotates the third barrel station between the plurality of outer positions.

Further, in various embodiments, dryer systems may comprise a control system operably coupled to at least one of the first barrel station or the second barrel station, wherein the control system, in response to being commanded, causes at least one of the first barrel to pivot about the first hinge or the second barrel to pivot about the second hinge in response to at least one of the first barrel station or the second barrel station being positioned at least one of a dumping position or a cleaning position. Such control systems can, for example, cause at least one of the first barrel or the second barrel to spin at a first speed in response to being positioned at the loading position, and cause at least one of the first barrel or the second barrel to spin at a second speed in response to being positioned at the drying position, wherein the second speed is faster than the first speed. Control systems in accordance with the present disclosure may comprise a tangible, non-transitory memory configured to communicate with the processor, the tangible, non-transitory memory having instructions stored thereon that, in response to execution by the processor, cause the processor to perform operations comprising: detecting, by the processor, whether at least one of the first barrel or the second barrel is empty or full, commanding, by the processor, the control system to rotate the turntable to move an empty barrel to the loading position of the plurality of outer positions, commanding, by the processor, the control system to fill the empty barrel, detecting, by the processor, a time at which the empty barrel is filled, and commanding, by the processor, the control system to rotate the turntable to move the filled barrel to a drying position.

In various embodiments in accordance with the present disclosure, a method for drying wet articles (such as produce) comprises filling a first empty barrel with the wet food articles, wherein the first empty barrel is one of a plurality of barrels coupled to a turntable surrounded by a plurality of outer positions, the turntable being configured to rotate about a central axis, wherein the first empty barrel is positioned at a loading position of the plurality of outer positions, spinning the first empty barrel at a first speed during the filling, and wherein subsequent to the filling the first empty barrel is a first filled barrel, rotating the turntable such that the first filled barrel is positioned at a first drying position of the plurality of outer positions, spinning the first filled barrel at a second speed in response to the rotating the turntable, wherein the second speed is faster than the first speed. Further, the method may comprise detecting a second empty barrel of the plurality of barrels coupled to the turntable, rotating the turntable such that the second empty barrel is positioned at the loading position of the plurality of outer positions, filling the second empty barrel with the wet food articles, spinning the second empty barrel at a third speed during the filling, and wherein subsequent to the filling the second empty barrel is a second filled barrel, and rotating the turntable such that the second filled barrel is positioned at a second drying position of the plurality of outer positions, wherein the second drying position is at least one of the same or different outer position than the first drying position, and spinning the second filled barrel at a fourth speed in response to the rotating the turntable such that the second filled barrel is positioned at the second drying position, wherein the fourth speed is faster than the third speed.

BRIEF DESCRIPTION OF THE DRAWINGS

Various embodiments of the present disclosure will be described in conjunction with the appended drawing figures in which like numerals denote like elements and.

DETAILED DESCRIPTION

The present disclosure is described herein in terms of various functional components. It should be appreciated that the present disclosure may be practiced in any number of food article drying systems, and are merely exemplary applications. Further, it should be noted that the present disclosure may employ any number of conventional techniques for spin drying wet food articles, and such general techniques that may be known to those skilled in the art are not described in detail herein.

In accordance with various aspects of the present disclosure and described in greater detail below, a spinning dryer system and methods of using such systems can provide for increased efficiency and/or shorter drying times. For example, the use of multiple drying stations, each of which can be independently controlled, can reduce the overall drying time and/or reduce the amount of energy needed to dry a specified amount of wet food articles (such as, for example, produce).

Figure 1A:
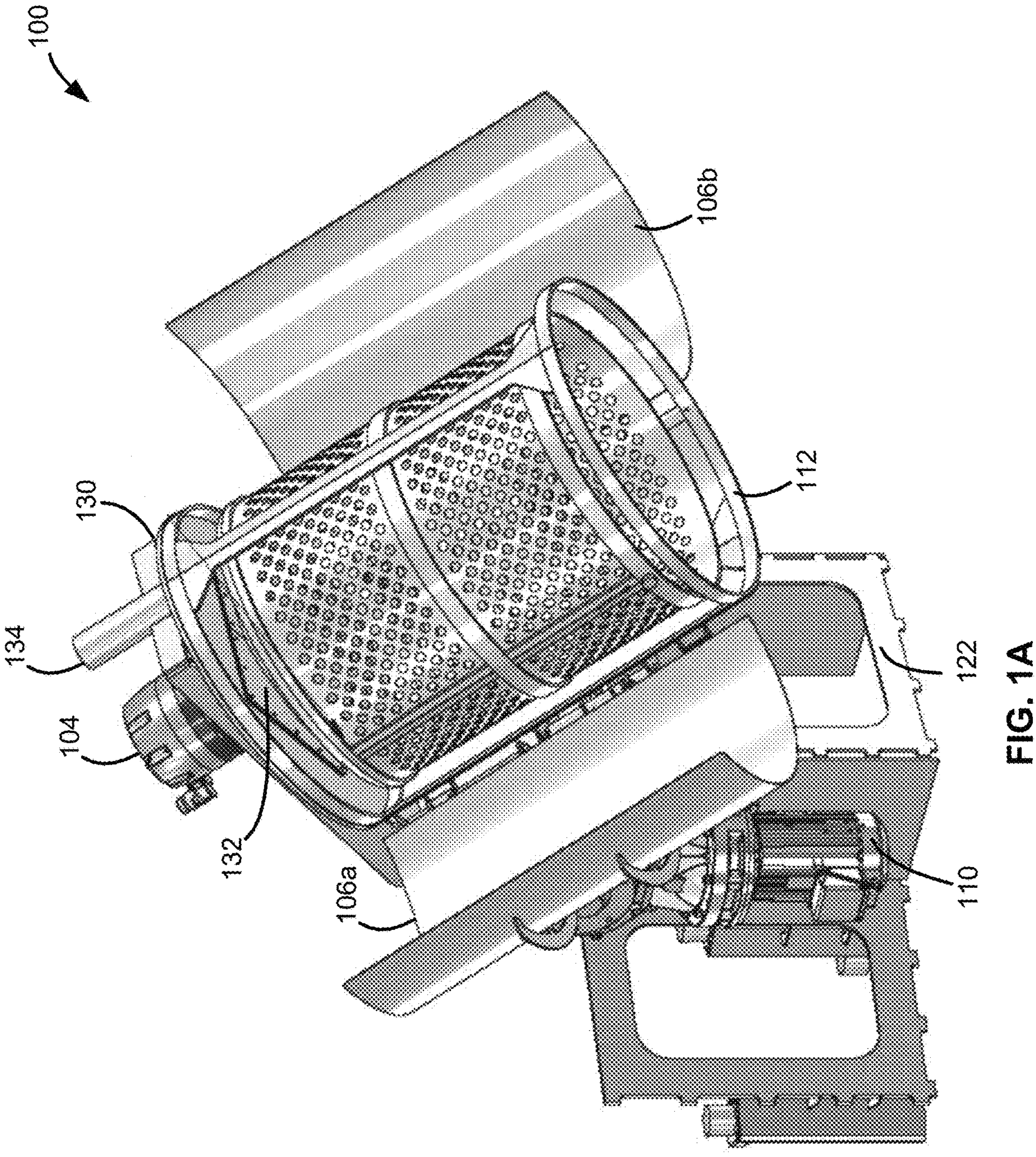
FIG. 1A illustrates a side view of a single barrel station of a spinning dryer system in accordance with the present disclosure.
Figure 1B:
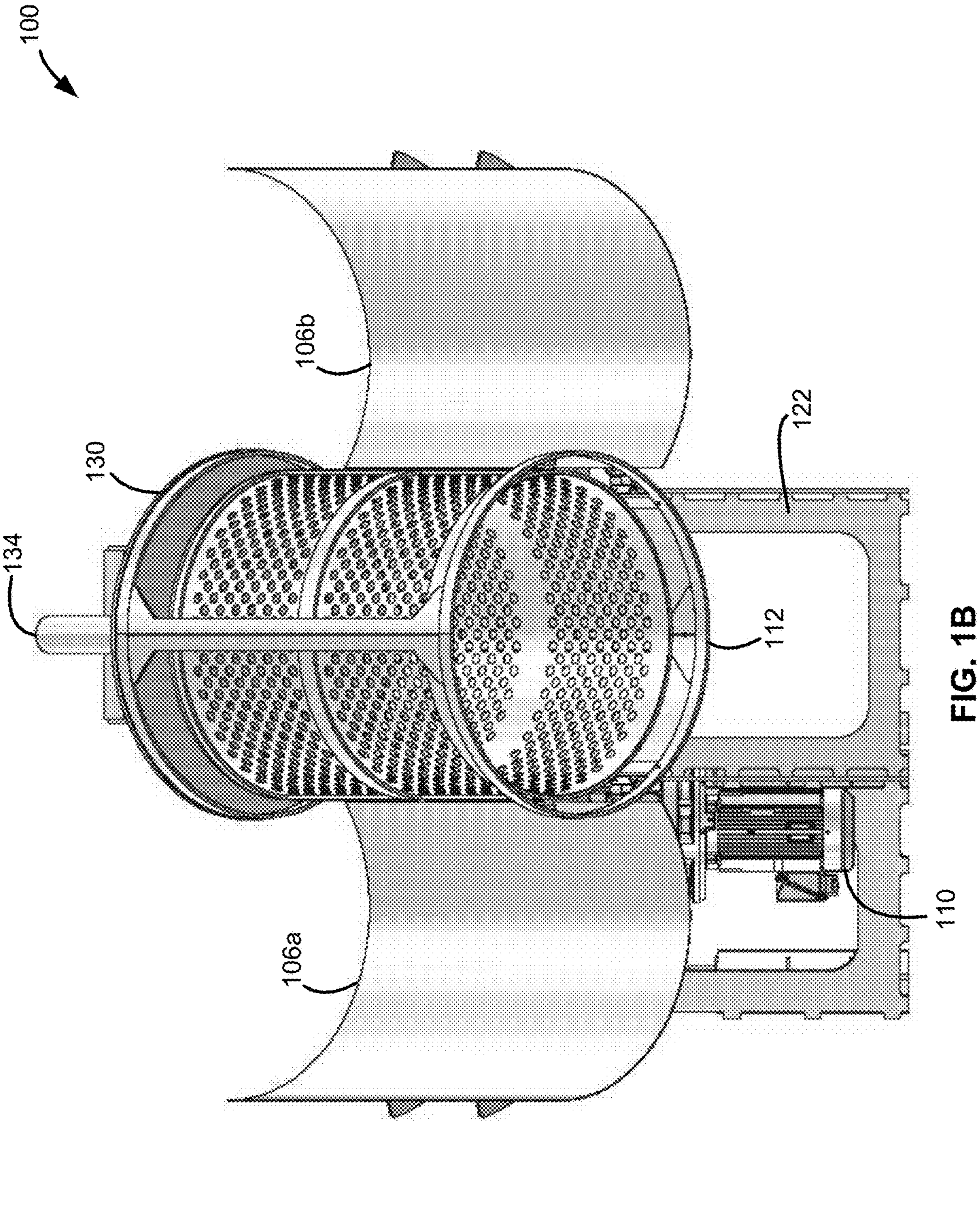
FIG. 1B illustrates a front view of the barrel station of FIG. 1A.
Figure 1C:
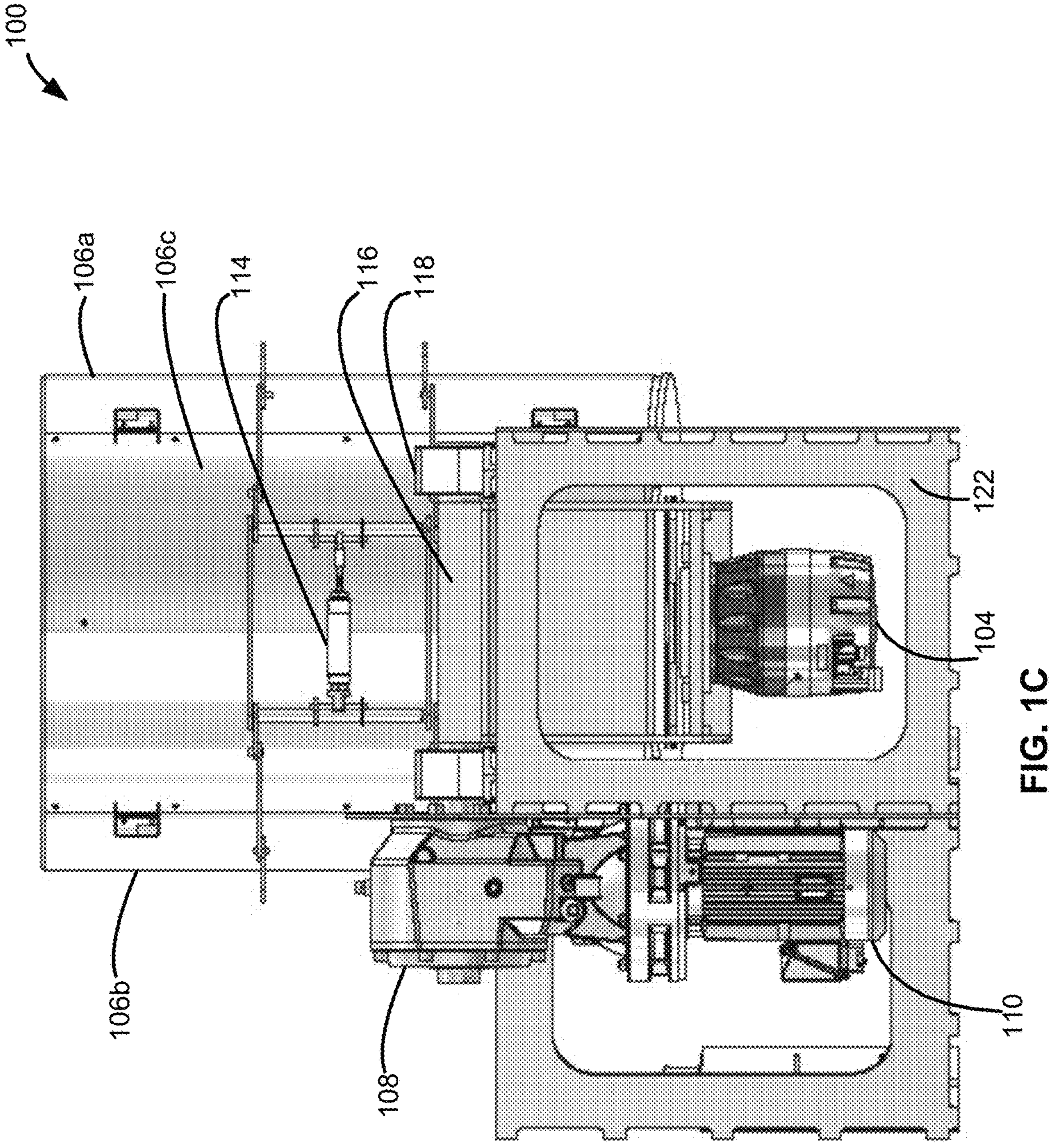
FIG. 1C illustrates a side view of the barrel station of FIGS. 1A and 1B.

In accordance with an embodiment and with reference to FIGS. 1A, 1B, and 1C, a spinning dryer system comprises a barrel station 100 having a barrel 112. In various embodiments, barrel station 100 is configured to receive a wet article, such as rinsed produce, within barrel 112 and dry the article via spinning. For example, barrel 112 can comprise a perforated, mesh, or otherwise discontinuous surface which allows liquid to pass through the barrel as it is spun. In various embodiments, barrel 112 comprises a food-grade metal material, such as stainless steel.

Barrel 112 can, for example, be affixed to a base 130. Further, barrel base 130 can be configured to secure barrel 112 to a rotational device. In various embodiments, barrel base 130 is coupled to a spin motor 104. Spin motor 104 can, for example, spin barrel 112 along a spin axis at sufficient speed to remove liquid from wet articles within barrel 112 via centrifugal force. Spin motor 104 can be removeably coupled to barrel base 130 by, for example, screws, bolts, or other removable means. In various embodiments, spin motor 104 comprises an electric motor. However, any rotational device capable of spinning barrel 112 at sufficient speed is within the scope of the present disclosure.

In various embodiments, base 130 can comprise a drainage section 132. For example, drainage section 132 can comprise a number of holes configured to allow liquid to flow out of the bottom of barrel 112. Further, base 130 can comprise a drainage pipe 134. Drainage section 132 may, for example, direct water collected by base 130 towards drainage pipe 134. In various embodiments, water exits barrel 112 and passes through drainage pipe 134.

Barrel 112 can be coupled to a turntable base 122 via a hinge 108. In various embodiments, hinge 108 pivots barrel 112 through a range of positions. For example, hinge 108 can pivot barrel 112 along a range of motion, such as pivoting between an upright position (in which the opening of barrel 112 is oriented substantially vertically) and an inverted position (in which barrel 112 is oriented such that the contents within barrel 112 can gravimetrically exit barrel 112). In various embodiments, barrel station 100 comprises a pivot shaft 116 coupled to barrel 112 and engaged with hinge 108. Pivot shaft 116 may, for example, be held in a proper orientation, alignment, and position by one or more fittings 118. In such embodiments, fittings 118 can be coupled to turntable base 122.

In various embodiments, barrel station 100 further comprises a pivot motor 110 coupled to hinge 108. Pivot motor 110 can, for example, rotate hinge 108 such that barrel 112 pivots along its range of motion. In such embodiments, the rotational movement of pivot motor 110 can be translated into rotation of pivot shaft 116, thereby pivoting barrel 112. In various embodiments, pivot motor 110 comprises an electric motor. However, any rotational device capable of rotating barrel 112 via hinge 108 is within the scope of the present disclosure.

Because pivot motor 110 and spin motor 104 are independent from each other, both motors can be operated individually. For example, barrel 112 can be spun by spin motor 104 as it is being pivoted by pivot motor 110. In various embodiments, as will be discussed in further detail, barrel 112 can rotate at a desired speed (e.g., a speed slower than the speed at which food is dried) while pivot motor 110 pivots barrel 112 from an upright position to an inverted position.

Barrel station 100 may further comprise, for example, a housing 106 comprising a first housing segment 106*a* and a second housing segment 106*b*. In various embodiments, first housing segment 106*a* and second housing segment 106*b* are secured to barrel 112 and configured to surround barrel 112 and limit the travel of liquid exiting barrel 112. Housing 106 can further comprise a stationary segment 106*c*, to which first housing segment 106*a* and second housing segment 106*b* are attached. First housing segment 106*a* and second housing segment 106*b* can be connected to stationary segment 106*c* in a manner that allows one or both of segments 106*a* and 106*b* to open and pivot away from barrel 112. Further, opening of first housing segment 106*a* and/or second housing segment 106*b* may be accomplished by an actuator 114. However, any means of opening first housing segment 106*a* and/or second housing segment 106*b* is within the scope of the present disclosure.

Figure 2A:
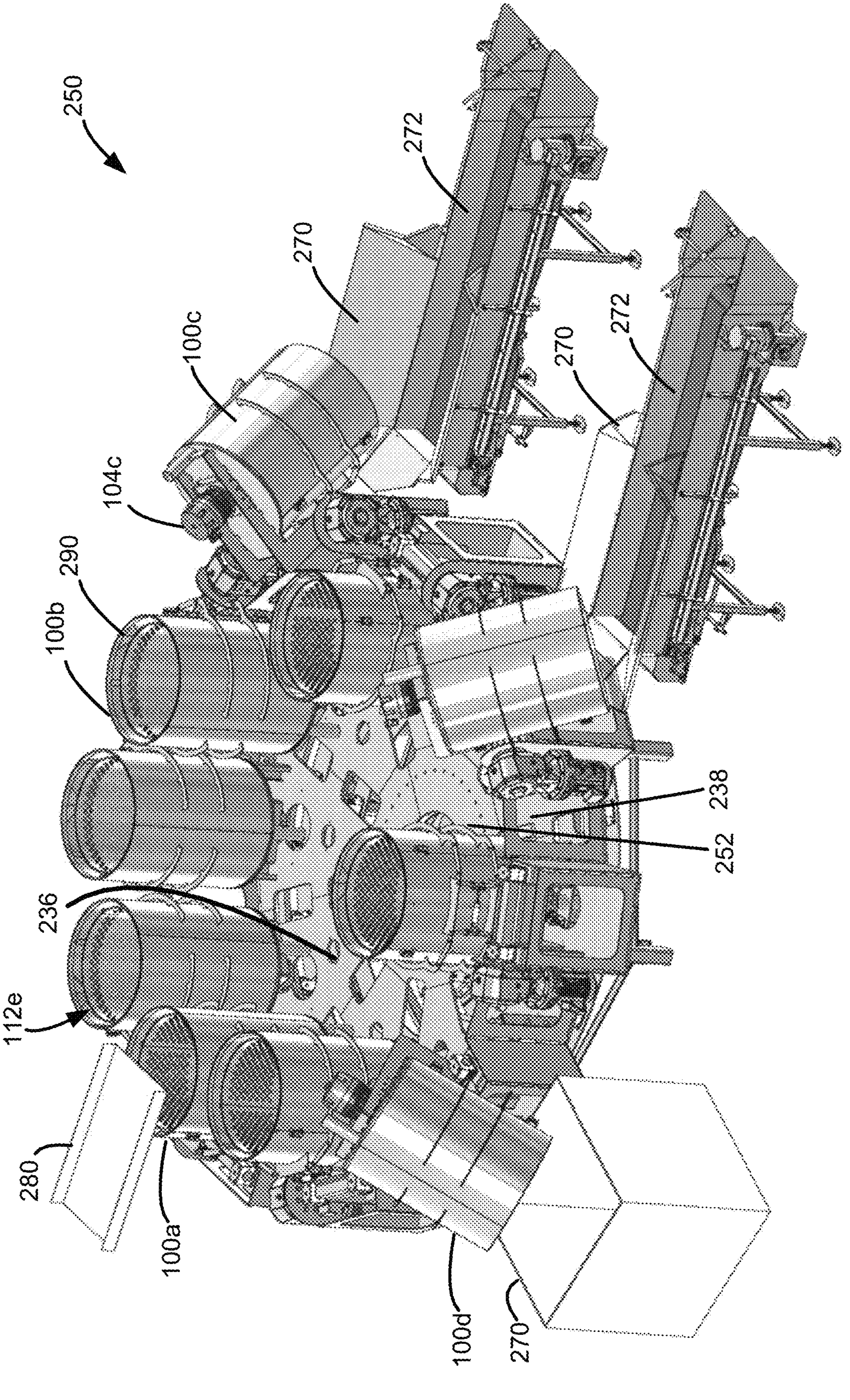
FIG. 2A illustrates a perspective view of a spinning dryer system in accordance with the present disclosure.
Figure 2B:
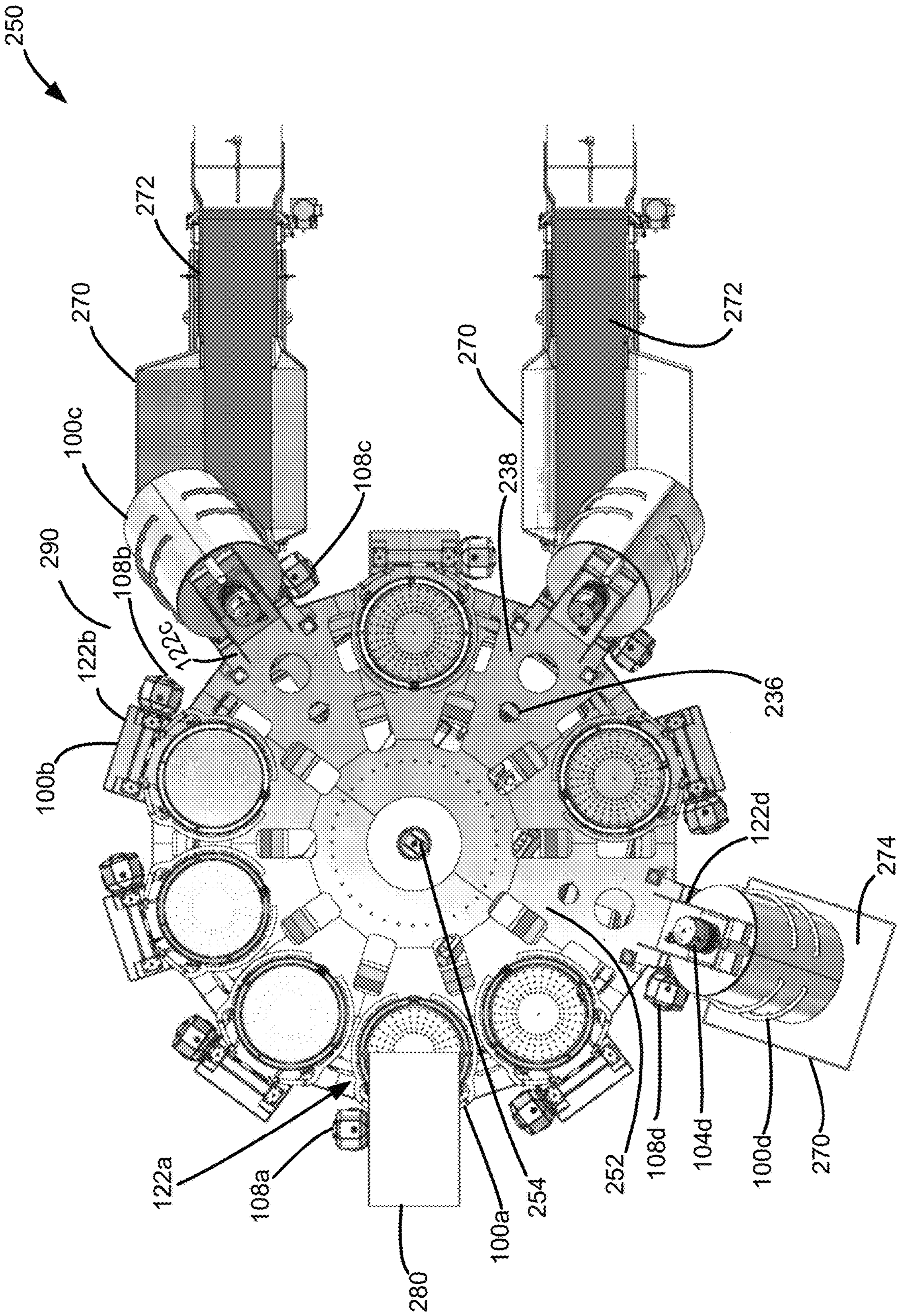
FIG. 2B illustrates a top view of the spinning dryer system of FIG. 2A.

With reference to FIGS. 2A and 2B, a spinning dryer system 250 is illustrated. In various embodiments, spinning dryer system 250 comprises a turntable 252 coupled to a rotational apparatus 254. Rotational apparatus 254 can, for example, be configured to rotate turntable 252 about a central axis. In various embodiments, rotational apparatus 254 comprises a motor capable of rotating turntable 252 both clockwise and counter-clockwise about the central axis.

In various embodiments, spinning dryer system 250 comprises a number of barrel stations 100 positioned along the perimeter of turntable 252. For example, spinning dryer system 250 comprises barrel stations 100*a*, 100*b*, 100*c*, and 100*d*. Barrel stations 100*a*, 100*b*, 100*c*, and 100*d* can comprise barrels 110*a*, 110*b*, 110*c*, and 110*d* coupled to turntable bases 122*a*, 122*b*, 122*c*, and 122*d* by hinges 108*a*, 108*b*, 108*c*, and 108*d*, respectively. In various embodiments, barrel stations 100*a*, 100*b*, 100*c*, and 100*d* comprise barrel stations as illustrated and described in connection with FIGS. 1A, 1B, and 1C.

Spinning dryer system 250 can comprise a number of different positions positioned along the outer circumference of turntable 252, each capable of performing a function related to drying wet articles, such as produce. In various embodiments, spinning dryer system 250 comprises a loading position 280, a drying position 290, and a dumping position 270.

Loading position 280 can, for example, comprise a chute, conveyor, or other device configured to allow wet articles to enter a dryer, such as barrel station 100*a*. Empty barrel station 100*a* can be rotated in to loading position 280 and filled with a specified amount of wet article (such as produce) for drying by spinning dryer system 250. Further, barrel 112*a* of barrel station 100*a* can rotate at a filling speed (e.g., a speed slower than that at which the wet article is dried) as wet articles are loaded into barrel station 100*a*. In various embodiments, the filling speed comprises between about 1 and about 40 revolutions per minute, and further, between about 5 and about 20 revolutions per minute. Filling barrel 112 while the barrel is spinning at the filling speed may also reduce or eliminate the need for a settling cycle, in which wet articles settle and distribute themselves within barrel 112. Further, the total drying time of the wet articles may be reduced. After empty barrel station 100*a* is sufficiently filled with wet articles, turntable 252 can rotate now-full barrel station 100*b* away from loading position 280.

In various embodiments, full barrel station 100*b* is rotated from loading position 280 to drying position 290. At drying position 290, full barrel station 100*b* can be spun at sufficient speed (e.g., a drying speed) and for sufficient length (e.g., a drying time) as to dry the wet articles inside. For example, a drying speed may comprise between about 100 and about 1,000 revolutions per minute, and further, between about 200 and about 700 revolutions per minute. Further, a drying time may comprise between about 30 seconds and about 10 minutes, and further, between about 90 seconds and about 5 minutes.

In various embodiments, full barrel station 100*b* can begin rotating before it has rotated from loading position 280 to drying position 290. For example, full barrel station 100*b* can accelerate from a first rotational speed (e.g., a filling speed) to the drying speed as it is rotating from loading position 280 to drying position 290. While in drying position 290, full barrel station 100*b* can continue accelerating to the drying speed, and maintain rotation at drying speed until the wet articles are sufficiently dry.

With additional reference to FIGS. 1A and 1B, during drying, water may, for example, be directed within barrel 112*e* towards base 130, and through drainage section 132. Further, water may be directed through drainage section 132 and through drainage pipe 134. In various embodiments, drainage pipe 134 is positioned to align with a corresponding feature of turntable 252. For example, turntable 252 may comprise one or more drainage receptacles 236 positioned to receive water exiting barrel 112*e* through drainage pipe 134. In such embodiments, water exiting barrel 112*e* (and other barrels of drying system 250) may be directed away from a surface 238 of turntable 252, improving safety of operation of spinning drying system 250. Further, surface 238 of turntable 252 may be sloped, such that water contacting surface 238 is directed towards the central axis of turntable 252.

After drying at drying position 290, turntable 252 can rotate now-dry barrel station 100*c* from drying position 290 to dumping position 270. At dumping position 270, barrel station 100*c* can be pivoted by hinge 108*c* from an upright position to an inverted position, allowing the now-dry articles inside to gravimetrically exit barrel station 100*c*. In various embodiments, dryer station 100*c* is spun at a speed slower than a drying speed (e.g., a dumping speed) during the dumping of dryer station 100*c*. For example, a dumping speed may comprise between about 1 and about 40 revolutions per minute, and further, between about 5 and about 20 revolutions per minute.

In various embodiments, dumping position 270 may comprise a conveyor 272 configured to receive and transport dried food articles (such as produce). Dumping position 270 may alternatively comprise a bin 274 configured to receive and at least temporarily store dried food articles.

Further, during dumping of barrel station 100*c*, air may be injected into barrel 110*c* to assist in dumping the dried food articles. For example, one or more air manifolds may be incorporated into and positioned within barrel station 100*c* to inject air into barrel 110*c* during dumping. In various embodiments, an air manifold may be incorporated into base 130 and/or stationary housing segment 106*c*. In such embodiments, air may be injected by the one or more air manifolds to apply force against the dried food articles, potentially increasing the rate at which the articles dump out of barrel 110*c* and/or reducing the number of dried food articles that remain in barrel 110*c* after dumping. Ideally, dumping removes every dried food article within barrel 110*c*, and air manifolds (such as those within base 130 and/or stationary housing segment 106*c*) may assist in removing all of the dried food articles from barrel 110*c*.

In various embodiments, spinning dryer system 250 further comprises a cleaning position. Turntable 252 can rotate one of barrel station 100*a*-100*d* to the cleaning position. For example, at the cleaning position, one of barrel station 100*a*-100*d* can be cleaned and sanitized in preparation for loading and drying of wet article.

Further, spinning dryer system 250 can comprise a combination of each type of position, including multiples of the same position. For example, as illustrated in FIGS. 2A and 2B, spinning dryer system 250 comprises one loading position 280, one drying position 290, and three dumping positions 270. However, the system illustrated in these figures is merely a single embodiment of spinning dryer system 250. Spinning dryer system 250 can comprise multiple loading positions 280, drying positions 290, dumping positions 270, and/or cleaning positions.

In various embodiments, spinning dryer system 250 comprises a control system. The control system can be configured to rotate turntable 252 and move various barrel stations (such as stations 100*a*-100*d*) between the various positions (such as loading positions 280, drying positions, 290, and dumping positions 270). Further, the control system can control the spinning and pivoting of each barrel (such as barrels 112) of each barrel station (such as barrel stations 100 and 100*a*-100*d*).

The control system may comprise, for example, a computer-based control system. In various embodiments, the control system comprises a processor and a tangible, non-transitory based memory configured to communicate with the processor. In such embodiments, the processor can be capable of detecting whether a barrel is full or empty. If the barrel is empty and prepared for filling, the processor can command the control system to rotate the empty barrel station to loading position 280. Once at loading position 280, the processor can command the control system to fill the barrel with wet food articles.

In various embodiments, the control system can further rotate turntable 252 and spin the now-full barrel station to drying position 290. Once at drying position 290, the control system can command the barrel station to spin the corresponding barrel, thereby drying the wet food articles within the barrel. Once sufficiently dry, the control system can rotate turntable 252 and the now-dry barrel station to dumping position 270. Once at dumping position 270, the command system can empty the barrel station.

In various embodiments, the control system is configured to command and control the various drying stations of spinning dryer system 250 independently from each other. For example, as a first barrel station 100*a* is rotating at a first speed (for example, when barrel station 100*a* is at loading position 280), a second barrel station 100*b* can be rotated at a second, higher speed (for example, when barrel station 100*b* is at drying position 290).

Each barrel station within spinning dryer system 250 may have associated with it a predetermined holding time. A predetermined holding time for a barrel may comprise, for example, the holding time associated with the particular wet food article within a particular barrel. A holding time for a particular wet food article may be determined based on the characteristics of the food article (e.g., fragility, porosity, density), as well as the desired condition of the food article (e.g., degree of desired dryness of the food article). In various embodiments, a holding time may comprise between about 1 and about 30 minutes, and further, between about 5 minutes and about 15 minutes.

In various embodiments, the control system records the predetermined holding time for each barrel station of spinning dryer system 250. As each barrel station is rotated through the various stations, the control system may maintain a timer for each barrel station, and compare the time elapsed by the timer with the predetermined holding time for each barrel. In various embodiments, the control system may prioritize the dumping of a barrel station of which the time elapsed is at or near it's predetermined holding time over, for example, the dumping of a barrel station in which the time elapsed is less than it's predetermined holding time.

The present disclosure sets forth spinning dryer systems and methods of use that are applicable to various spin drying applications. It will be understood that the foregoing description is of embodiments of the disclosure, and that the disclosure is not limited to the specific forms shown. Various modifications may be made in the design and arrangement of the elements set forth herein without departing from the scope of the disclosure. For example, the location of components (such as components of the drying stations) can be suitably modified, adjusted, and/or re-configured. These and other changes or modifications are intended to be included within the scope of the present disclosure.

What is claimed is:

1. A spinning dryer system, comprising:

a turntable being configured to rotate about a central axis;

a first barrel station comprising a first barrel coupled to the turntable, a first motor coupled to the first barrel, and a first housing enclosing at least a portion of the first barrel, wherein the first motor spins the first barrel about a first spin axis, wherein the first housing comprises a first housing segment, a second housing segment, and a stationary third housing segment, wherein at least one of the first housing segment or the second housing segment is moveable relative to the first barrel, and wherein the stationary third housing segment is coupled to at least one of the first housing segment or the second housing segment;

a second barrel station comprising a second barrel coupled to the turntable and a second motor coupled to the second barrel, wherein the second motor spins the second barrel about a second spin axis independent of the first barrel station, wherein the first barrel station and the second barrel station are disposed on a perimeter of the turntable, and the turntable rotates the first barrel station and the second barrel station between a plurality of outer positions; and at least one air injection device coupled to the stationary third housing segment to expedite drying and emptying of the first barrel.

2. The spinning dryer system of claim 1, wherein at least one of the first barrel or the second barrel is configured to pivot between an upright position and an inverted position.

3. The spinning dryer system of claim 1, wherein a control system is operably coupled to the turntable and to at least one of the first barrel station or the second barrel station.

4. The spinning dryer system of claim 3, wherein any of the plurality of outer positions may be at least one of a loading position, a drying position, a dumping position, or a cleaning position.

5. The spinning dryer system of claim 4, wherein the control system, in response to being commanded, causes at least one of the first barrel or the second barrel to pivot between an upright position and an inverted position in response to at least one of the first barrel station or the second barrel station being positioned at least one of at a dumping position or at a cleaning position.

6. The spinning dryer system of claim 4, wherein the control system is operably coupled to at least one of the first motor or the second motor, wherein the control system, in response to being commanded, causes at least one of the first motor to spin the first barrel about the first spin axis, or the second motor to spin the second barrel about the second spin axis, in response to at least one of the first barrel station or the second barrel station being positioned at least one of at a loading position, at a drying position, at a dumping position, or in an upright position.

7. The spinning dryer system of claim 4, wherein the control system causes at least one of the first barrel or the second barrel to spin at a first speed in response to being positioned at the loading position, and causes at least one of the first barrel or the second barrel to spin at a second speed in response to being positioned at the drying position, wherein the second speed is faster than the first speed.

8. The spinning dryer system of claim 4, wherein the control system comprises:

a processor; and a tangible, non-transitory memory configured to communicate with the processor, the tangible, non-transitory memory having instructions stored thereon that, in response to execution by the processor, cause the processor to perform operations comprising:

detecting, by the processor, whether at least one of the first barrel or the second barrel is empty or full;

commanding, by the processor, the control system to rotate the turntable to move an empty barrel to the loading position of the plurality of outer positions;

commanding, by the processor, the control system to fill the empty barrel;

detecting, by the processor, a time at which the empty barrel is filled; and commanding, by the processor, the control system to rotate the turntable to move the filled barrel to the drying position.

9. The spinning dryer system of claim 8, wherein the operations further comprise commanding, by the processor, the control system to spin the empty barrel at a first speed while the empty barrel being is filled.

10. The spinning dryer system of claim 9, wherein the operations further comprise commanding, by the processor, the control system to spin the filled barrel at a second speed in response to the filled barrel being moved from the loading position, wherein the second speed is faster than the first speed.

11. The spinning dryer system of claim 8, wherein the operations further comprise commanding, by the processor, the control system to rotate the turntable to move a second empty barrel into the loading position at the same time as the commanding the control system to rotate the turntable to move the filled barrel to the drying position.

12. The spinning dryer system of claim 1, further comprising a control system operably coupled to the turntable and to at least one of the first barrel station or the second barrel station, wherein the control system, in response to being commanded, causes the first motor to spin the first barrel in response to at least a portion of the first barrel being exposed by at least one of the first housing segment and the second housing segment being pivoted away from the first barrel.

13. The spinning dryer system of claim 1, further comprising a third barrel station comprising:

a third barrel coupled to the turntable, wherein the third barrel is configured to pivot between an upright position and an inverted position independent of the first barrel station and the second barrel station; and a third motor coupled to the third barrel, wherein the third motor spins the third barrel about a third spin axis independent of the first barrel station and the second barrel station, wherein the third barrel station is disposed on the perimeter of the turntable, and wherein the turntable rotates the third barrel station between the plurality of outer positions.

14. The spinning dryer system of claim 1, wherein the first barrel housing is configured to be opened by pivoting at least one of the first housing segment and the second housing segment away from the first barrel to expose the first barrel for cleaning.

15. The spinning dryer system of claim 8, wherein the operations further comprise recording, by the processor, a predetermined holding time for at least one of the first barrel or the second barrel.

16. The spinning dryer system of claim 15, wherein the control system further comprises a timer configured to compare a time elapsed by the timer with the predetermined holding time for each barrel.

17. The spinning dryer system of claim 15, wherein the predetermined holding time is between about 1 minute and about 30 minutes.

18. A spinning dryer system, comprising:

a turntable being configured to rotate about a central axis;

a first barrel station comprising a first barrel coupled to the turntable, a first motor coupled to the first barrel, and a first housing enclosing at least a portion of the first barrel, wherein the first motor spins the first barrel about a first spin axis, wherein the first housing comprises a first housing segment and a second housing segment, wherein at least one of the first housing segment or the second housing segment is moveable relative to the first barrel;

a second barrel station comprising a second barrel coupled to the turntable and a second motor coupled to the second barrel, wherein the second motor spins the second barrel about a second spin axis independent of the first barrel station, wherein the first barrel station and the second barrel station are disposed on a perimeter of the turntable, and the turntable rotates the first barrel station and the second barrel station between a plurality of outer positions; and at least one air injection device coupled to at least one of the first barrel station and the second barrel station to inject air into at least one of the first barrel and the second barrel to expedite drying and emptying of at least one of the first barrel and the second barrel; and a control system operably coupled to the turntable and to at least one of the first barrel station or the second barrel station, wherein the control system, in response to being commanded, causes the first motor to spin the first barrel in response to at least a portion of the first barrel being exposed by at least one of the first housing segment and the second housing segment being pivoted away from the first barrel.

* * * * *